(12) United States Patent
Ikawa

(10) Patent No.: US 12,268,211 B2
(45) Date of Patent: Apr. 8, 2025

(54) SPRAYING AGENT COMPRISING PESTICIDE

(71) Applicant: SHIKOKU-CAGE CO., Ltd., Ehime (JP)

(72) Inventor: Shigeki Ikawa, Ehime (JP)

(73) Assignee: SHIKOKU-CAGE CO., Ltd., Ehime (JP)

( * ) Notice: Subject to any disclaimer, the term of this patent is extended or adjusted under 35 U.S.C. 154(b) by 756 days.

(21) Appl. No.: 17/416,851

(22) PCT Filed: Dec. 26, 2019

(86) PCT No.: PCT/JP2019/051209
§ 371 (c)(1),
(2) Date: Jun. 21, 2021

(87) PCT Pub. No.: WO2020/138323
PCT Pub. Date: Jul. 2, 2020

(65) Prior Publication Data
US 2022/0022459 A1    Jan. 27, 2022

(30) Foreign Application Priority Data

Dec. 28, 2018    (JP) ................. 2018-246595

(51) Int. Cl.
*A01N 59/14*    (2006.01)
*A01N 25/02*    (2006.01)
*A01P 7/02*    (2006.01)
*A01P 7/04*    (2006.01)

(52) U.S. Cl.
CPC ............ *A01N 59/14* (2013.01); *A01N 25/02* (2013.01); *A01P 7/02* (2021.08); *A01P 7/04* (2021.08)

(58) Field of Classification Search
None
See application file for complete search history.

(56) References Cited

U.S. PATENT DOCUMENTS

| 2,657,167 | A | * | 10/1953 | Walton | .................. | C07C 23/30 |
| | | | | | | 570/252 |
| 6,200,586 | B1 | | 3/2001 | Lambie et al. | | |
| 6,224,734 | B1 | | 5/2001 | Kober et al. | | |
| 2002/0035070 | A1 | * | 3/2002 | Gardlik | .................. | A61K 8/733 |
| | | | | | | 514/23 |
| 2004/0166246 | A1 | | 8/2004 | Holcomb | | |
| 2005/0170966 | A1 | * | 8/2005 | Scovell | .................. | A01N 25/30 |
| | | | | | | 562/557 |
| 2017/0172154 | A1 | * | 6/2017 | Barrera Cubillos | ... | A01N 63/40 |

FOREIGN PATENT DOCUMENTS

| CA | 2609493 A1 * | 11/2006 | ............ A01N 25/02 |
| CN | 1045682 | 10/1990 | |
| CN | 1143305 | 2/1997 | |
| CN | 102342296 A | 2/2012 | |
| CN | 102643144 A | 8/2012 | |
| CN | 102674993 A | 9/2012 | |
| CN | 104593555 A * | 5/2015 | |
| JP | 10-291205 A | 11/1998 | |
| JP | H10-291205 | 11/1998 | |
| JP | 2002-511395 A | 4/2002 | |
| JP | 2003-238320 A | 8/2003 | |
| JP | 2005-511262 A | 4/2005 | |
| JP | 2009-227611 A | 10/2009 | |
| JP | 2017-190318 | 10/2017 | |
| JP | 2017-190318 A | 10/2017 | |
| JP | 2018-29573 A | 3/2018 | |
| WO | WO-9637106 A1 * | 11/1996 | ............ A01N 25/22 |
| WO | 2007/102688 A1 | 9/2007 | |

OTHER PUBLICATIONS

Cassiday www.aocs.org/stay-informed/inform-magazine/featured-articles/emulsions-making-oil-and-water-mix-april-2014?SSO=True# (Year: 2012).*
Altun et al. Proceedings World Geothermal Congress Jan. 8, 2010 (Year: 2010).*
International Search Report (ISR) dated Mar. 17, 2020 filed in PCT/JP2019/051209.
Office Action issued on Jul. 13, 2022 for the corresponding Chinese Patent Application No. 201980086071.9 and its partial translation.
Korean Office Action (KROA) issued on Jul. 23, 2024 for Korean Patent Application No. 10-2021-7019071 and its English machine translation.

* cited by examiner

*Primary Examiner* — Melissa S Mercier
*Assistant Examiner* — Caralynne E Helm
(74) *Attorney, Agent, or Firm* — RANKIN, HILL & CLARK LLP

(57) ABSTRACT

An object of the present invention is to provide a spraying agent containing a pesticide having a higher pesticidal effect. The spraying agent of the embodiment of the present invention is characterized by being an aqueous solution containing, as the pesticide, boric acid that acts as a food poison for pests (for example, red mites) and an alkali metal silicate that acts as a spiracle barrier and a migration suppressor for pests, and further containing at least one of a protein and a carbohydrate for acting to attract or feed the pests, and an emulsifier or a surfactant and a fat and oil having an effect of removing the oil or fat on the epidermis of the pests.

7 Claims, 2 Drawing Sheets

FIG. 1

| NUMBER OF DEAD RED MITES (NUMBER) | | | | |
|---|---|---|---|---|
| ELAPSED TIME | 24 HOURS | 48 HOURS | 72 HOURS | 96 HOURS |
| COMPARATIVE EXAMPLE 1 | 0 | 0 | 0 | 0 |
| COMPARATIVE EXAMPLE 2 | 0 | 5 | 9 | 20 |
| COMPARATIVE EXAMPLE 3 | 25 | 46 | 60 | 65 |
| COMPARATIVE EXAMPLE 4 | 0 | 0 | 0 | 0 |
| EXAMPLE | 42 | 70 | 74 | 89 |

FIG. 2

| NUMBER OF DEAD FLIES (NUMBER) / ATTRACTING RATIO (%) | | | | |
|---|---|---|---|---|
| ELAPSED TIME | 24 HOURS | 48 HOURS | 72 HOURS | 96 HOURS |
| COMPARATIVE EXAMPLE 1 | 0/20 | 0/20 | 0/20 | 0/20 |
| COMPARATIVE EXAMPLE 2 | 0/30 | 1/30 | 6/40 | 15/40 |
| COMPARATIVE EXAMPLE 3 | 0/30 | 11/30 | 15/40 | 17/40 |
| COMPARATIVE EXAMPLE 4 | 0/90 | 0/90 | 0/90 | 0/90 |
| EXAMPLE | 13/90 | 28/90 | 40/90 | 46/90 |

SPRAYING AGENT COMPRISING PESTICIDE

TECHNICAL FIELD

The present invention relates to a spraying agent for pests for livestock and poultry in a barn, the spraying agent containing a pesticide.

BACKGROUND ART

In recent years, in a livestock industry, there has been a problem of a large outbreak of pests in a barn. For example, in a poultry farming industry, there has been a problem of a decrease in feed intake, a decrease in egg-laying rate and the like due to anemia or stress to be sucked of chickens caused by pests such as red mites, *Ornithonyssus sylviarum* or the like, which suck blood of chickens or the like. As a countermeasure against an occurrence of pests for livestock and poultry, conventionally, a controlling agent containing an insecticidal component has been sprayed in a barn for controlling pests (for example, see Patent Literature 1).

CITATION LIST

Patent Literature

Patent Literature 1: JP 2009-227611 A

SUMMARY OF THE INVENTION

Problems to be Solved by the Invention

However, for a pesticidal effect on pests, there has been still room for further improvement in a conventional spraying agent such as a controlling agent sprayed in a barn. For example, in a conventional controlling agent, a direct application to pests is required. Therefore, pests to which the controlling agent has not attached migrate without dying, and as a result, a desirable pesticidal effect matching an application amount of the controlling agent cannot be exhibited. Accordingly, an object of the present invention is to provide a spraying agent containing a pesticide having a higher pesticidal effect than before.

Solution to the Problems

The present invention has been made to solve at least a part of the above-described problems, and can be embodied as the following applicable examples. Note that reference signs in parentheses, supplementary explanation and the like in the specification indicate correspondence relationships with an embodiment described below in order to help understand the present invention, and do not limit the present invention at all.

A spraying agent containing a pesticide of Applicable Example 1 in the present invention contains, as the pesticide, boric acid that acts as a food poison for pests, and an alkali metal silicate that acts as a spiracle barrier and a migration suppressor for the pests.

A spraying agent containing a pesticide of Applicable Example 2 in the present invention is the spraying agent of Application Example 1, containing at least one of a protein and a carbohydrate and acts to attract or feed the pests.

A spraying agent containing a pesticide of Application Example 3 in the present invention is the spraying agent of Applicable Example 1 or Applicable Example 2, being an aqueous solution containing an emulsifier or a surfactant and an oil or fat, and having an action of removing a fat and oil on the epidermis of the pests.

BRIEF DESCRIPTION OF THE DRAWINGS

FIG. 1 is a table illustrating experimental results of Experiment 1.

FIG. 2 is a table illustrating experimental results of Experiment 2.

DESCRIPTION OF THE EMBODIMENTS

Hereinafter, a description is made of embodiments to which the present invention is applied. Note that the embodiments of the present invention are not limited to the following examples at all, but various forms can be adopted as long as they fall within a technical scope of the present invention. Note that pests in the embodiment of the present invention are flies and mites, and specific examples of the mites include ixodid ticks, red mites, and *Ornithonyssus sylviarum*, which are pests for livestock and poultry.

A spraying agent according to an embodiment of the present invention is an aqueous solution containing, as a pesticide, boric acid that acts as a food poison for pests, and an alkali metal silicate that acts as a spiracle barrier and a migration suppressor for the pests. In addition, the spraying agent further contains a protein and a carbohydrate for acting to attract or feed the pests, and an emulsifier or a surfactant and a fat and oil having an effect of removing the oil or fat on the epidermis of the pests.

Description of Spraying Agent of Embodiment

The spraying agent in the embodiment is produced by dissolving 10 kg of a first base material and 10 kg of a second base material in 500 L of water. The first base material is a mixture obtained by mixing 9.5 kg of a borate and 0.5 kg of a mixture of a powdery oil or fat, a protein, a carbohydrate and an emulsifier or a surfactant. The second base material is composed of 10 kg of a water-soluble alkali metal silicate. The mixture of the powdery oil or fat, the protein, the carbohydrate and the emulsifier or the surfactant in the first base material is obtained by, with respect to 100 parts by mass, stirring 25 to 35 parts by mass of the powdery oil or fat, 0.5 to 1.5 parts by mass of the powdery protein, 50 to 70 parts by mass of the powdery carbohydrate, and 0.5 to 1.5 parts by mass of the powdery emulsifier or a surfactant. The mixture is particularly preferably obtained by, with respect to 100 parts by mass, stirring 30 parts by mass of the powdery oil or fat, 1 part by mass of the powdery protein, 60 parts by mass of the powdery carbohydrate, and 1 part by mass of the powdery emulsifier or a surfactant.

In the spraying agent of the embodiment, the borate is preferably sodium borate. In addition, boric acid, an alkali metal borate, an alkaline earth metal borate and the like can be used, and hydrates of these borates may be used. More specifically, potassium tetraborate, potassium metaborate, ammonium borate, borax or the like may be used.

In the spraying agent of the embodiment, sodium silicate, potassium silicate, and hydrates thereof are preferable as the alkali metal silicate, and sodium metasilicate nonahydrate is particularly preferable. In addition, sodium orthosilicate, a mixture of silicon dioxide and sodium oxide (generally represented as $Na_2O \cdot nSiO_2$), a mixture of silicon dioxide and potassium oxide (generally represented as $K_2O \cdot mSiO_2$), or the like may be used.

In the spraying agent of the embodiment, the powdery oil or fat is preferably a powdery animal oil or fat, and particularly preferably a powdery chicken oil. In addition, the animal oil or fat may be lard, beef tallow, milk fat, or the like. The oil or fat may be a vegetable oil or fat. Specifically, coconut oil, palm oil, corn oil, cottonseed oil, olive oil, rapeseed oil, sesame oil, soybean oil, sunflower oil, or the like may be used.

In the spraying agent of the embodiment, the protein is preferably casein, and in addition may be any of animal protein and plant protein. Specific examples thereof include whey, albumen, soybean protein, wheat protein or the like.

In the spraying agent of the embodiment, the carbohydrate may be saccharides such as monosaccharides or disaccharides. In the above-described production, corn syrup is preferable. In addition, the carbohydrate may include glucose powder, fructose powder, sugar or the like.

In the spraying agent of the embodiment, the emulsifier or the surfactant is preferably glycerin fatty acid ester, and in addition may be, for example, sorbitan fatty acid ester, sucrose fatty acid ester, propylene glycol fatty acid ester, soybean phospholipid (soybean lecithin), or Saponin or the Like.

Effects of Embodiment

According to such as the spraying agent, since the spraying agent contains the boric acid, when the spraying agent is sprayed into a barn, the boric acid can act as the food poison for the pests such as flies, mites and the like in the barn, to weaken or kill the fed pests. In addition, since the alkali metal silicate contained in the spraying agent has a predetermined viscosity, the alkali metal silicate can act as a spiracle barrier for the pests with the predetermined viscosity to weaken or kill the pests such as flies, mites and the like. Furthermore, since the alkali metal silicate contained in the spraying agent has a predetermined viscosity, the alkali metal silicate can also suppress migration of the pests, for example, the pests with flying ability or the like such as the flies or the like, and thus enhance the action of the food poison due to the boric acid and the action of the spiracle barrier due to the alkali metal silicate. In particular, in the spraying agent of the embodiment, since a pH value is adjusted to 8.5 to 10.5 (more preferably 9.0 to 10.0), the alkali metal silicate whose viscosity changes depending on the pH value effectively acts as the migration suppressor and the spiracle barrier for the pests, and can be made suitable for spraying with a sprayer or the like. In other words, according to such as the spraying agent, for example, when the spraying agent is sprayed in the barn, it can be said that the pesticidal effect is higher than that of a conventional controlling agent not containing the boric acid and the alkali metal silicate.

According to such as the spraying agent, since the spraying agent contains the protein or the carbohydrate, when the spraying agent is sprayed in the barn, the protein or the carbohydrate acts to attract or feed the pests such as flies, mites or the like in the barn, to enhance the pesticidal effect due to the boric acid or the alkali metal silicate described above.

According to such as the spraying agent, since the spraying agent contains the emulsifier or the surfactant, and the oil or fat, when the spraying agent is sprayed into the barn, the spraying agent acts as a removing agent for removing the fat and oil on the epidermis of the pests. Then, with respect to the pests from which the fat and oil on the epidermis has been removed, the action such as the spiracle barrier or the like due to the alkali metal silicate is enhanced, and thus, the pesticidal effect is further enhanced.

In addition, it is generally known that the alkali metal silicate has a sterilization effect, and that when the pH value is 10.0 or more, there is the sterilization effect. In other words, according to such a spraying agent, the sterilization effect is also exhibited in the barn into which the spraying agent has been dispersed. Furthermore, since the alkali metal silicate also exerts effects of rust prevention and flame prevention on a member to which the alkali metal silicate has attached, when the spraying agent containing the alkali metal silicate is sprayed in the barn as described above, the effects of rust prevention and flame prevention in the barn will be exhibited. Furthermore, the emulsifier or the like and the oil or fat contained in the spraying agent of the above-described Example not only exhibit the effect of the removing agent for removing the fat and oil on the epidermis of pests, but also act as a cleaning agent for oil-or-fat contamination or the like in the barn, when the spraying agent is sprayed in the barn.

Description of Experiment 1 and Experiment 2 in Example to which Embodiment is Applied Next, a description is made of the effects of the above-described spraying agent on pests such as red mites and flies with reference to FIGS. 1 and 2. FIG. 1 is a table illustrating experimental results of Experiment 1. FIG. 2 is a table illustrating experimental results of Experiment 2.

Here, a description is made of specific methods for Experiment 1 and Experiment 2. Experiment 1 was an experiment for counting the number of dead red mites with respect to the elapsed time when each of the spraying agents of Comparative Examples 1 to 4, and the Example to which the above-described embodiment was applied was sprayed to 100 red mites. More specifically, five translucent acrylic resin containers forming a closed space having a length of 50 cm, a width of 30 cm and a height of 30 cm were prepared. Then, 100 red mites were placed in each closed space, and left to stand for 96 hours in a state where each spraying agent was sprayed 5 times into each closed space with an atomizer. The number of dead red mites every 24 hours was visually counted. Experiment 2 was an experiment for counting the number of dead flies and the attracting ratio of flies with respect to the elapsed time when each of the spraying agents of Comparative Examples 1 to 4 and the Example was supplied to 50 flies. More specifically, five translucent acrylic resin containers forming a closed space having a length of 50 cm, a width of 30 cm and a height of 30 cm were prepared. Then, 50 flies were placed in each closed space, and left to stand for 96 hours in a state where a petri dish containing 50 ml of each spraying agent was put in each closed space. The number of dead flies and the attracting ratio every 24 hours were visually counted. The attracting ratio of flies was a numerical value obtained by calculating a ratio of the total number of living flies gathering in the vicinity of the petri dish and dead flies in the vicinity of the petri dish with respect to a total of 50 flies. In addition, in the acrylic resin containers used in Experiments 1 and 2, a ventilation hole having a size that does not allow passage of red mites and flies was formed.

A description is made of the compositions of the respective spraying agents of Comparative Examples 1 to 4 and the composition of the spraying agent of the Example used in Experiment 1 and Experiment 2. The spraying agent of the Example was an aqueous solution in which 19 g of boric acid, 20 g of sodium metasilicate, and 1 g of a mixture were dissolved with respect to 1000 cc of water. The mixture was obtained by, with respect to 100 parts by mass, stirring 30 parts by mass of rapeseed oil, 1 part by mass of casein, 60 parts by mass of corn syrup, 1 part by mass of glycerin fatty acid ester, 5 parts by mass of skimmed milk powder, and 3 parts by mass of calcium carbonate. The spraying agent of Comparative Example 1 was an aqueous solution obtained by dissolving 4 ml of an alkaline detergent (trade name "Shift" (registered trademark), manufactured by Evans Vanodine International PLC., in which the main components are sodium hydroxide, a nonionic surfactant and an ampholytic surfactant) in 1000 cc of water. The spraying agent of Comparative Example 2 was an aqueous solution obtained by dissolving 19 g of boric acid in 1000 cc of water. The spraying agent of Comparative Example 3 was an aqueous solution obtained by dissolving 19 g of boric acid and 20 g of sodium metasilicate in 1000 cc of water. Comparative Example 4 was an aqueous solution obtained by dissolving 1 g of the above-described mixture in 1000 cc of water.

As shown in FIG. 1, in Experiment 1, first, when the spraying agent of Comparative Example 1 was sprayed, the number of dead red mites after the lapse of 96 hours was 0. Next, when the spraying agent of Comparative Example 2 was sprayed, the number of dead red mites after the lapse of 24 hours was 0, but the number of dead red mites after the lapse of 48 hours was 5, the number of dead red mites after the lapse of 72 hours was 9, and the number of dead red mites after the lapse of 96 hours was 20. Next, when the spraying agent of Comparative Example 3 was sprayed, the number of dead red mites after the lapse of 24 hours was 25, the number of dead red mites after the lapse of 48 hours was 46, the number of dead red mites after the lapse of 72 hours was 60, and the number of dead red mites after the lapse of 96 hours was 65. Next, when the spraying agent of Comparative Example 4 was sprayed, the number of dead red mites after the lapse of 96 hours was 0. When the spraying agent of the Example was sprayed, the number of dead red mites after the lapse of 24 hours was 42, the number of dead red mites after the lapse of 48 hours was 70, the number of dead red mites after the lapse of 72 hours was 74, and the number of dead red mites after the lapse of 96 hours was 89.

According to the results of Experiment 1, Comparative Example 2 and Comparative Example 3 containing the boric acid and the like have a larger number of dead red mites compared to Comparative Example 1 and Comparative Example 4 not containing the boric acid or the like, so that it can be said that the boric acid and the like have an effect as the pesticide. In particular, as compared to Comparative Example 2 containing only the boric acid that acts as the food poison, Comparative Example 3 containing the alkali metal silicate that acts as the spiracle barrier or the like together with the boric acid has a larger number of dead red mites in a short time, so that it can be said that the alkali metal silicate that acts as the spiracle barrier and the like is the pesticide having the immediate effect as compared to the boric acid that acts as the food poison, and has the sufficient effect as the pesticide. The Example has not only a larger number of dead red mites in a short time but also the largest number of dead red mites after the lapse of 96 hours as compared to Comparative Examples 1 to 4, so that it can be said that the effects of the boric acid and the alkali metal silicate as the pesticide are enhanced due to the protein and the like as an attractant and a feeding promoter, and the emulsifier and the like as the removing agent for removing the fat and oil on the epidermis of the pests.

In Experiment 1, it was visually confirmed that in Comparative Example 4 and the Example containing the protein and the carbohydrate as the attractant or the like for the pests and the like, the red mites and larvae of the red mite gathered at a place where the spraying agent was considered to be sprayed thickly, as compared to Comparative Examples 1 to 3 not containing the protein or the like. In particular, in Comparative Example 4 and the Example, it was also confirmed that the larvae exhibiting less migration adult red mites gathered at a place where the spraying agent was thickly sprayed and fed on the protein and the like, and the excrement from the adult insect. In other words, in the case of the spraying agent of the Example, it can be said that the effect as the pesticide is further enhanced due to a chain action that larvae of red mite feed on the food poison contained in the excrement from the adult insect fed with boric acid as the food poison.

As shown in FIG. 2, in Experiment 2, first, when the spraying agent of Comparative Example 1 was charged, the number of dead flies after the lapse of 96 hours was 0, and the attracting ratio of flies was always 20% (about 10 flies gathered in the vicinity of the petri dish). Next, when the spraying agent of Comparative Example 2 was charged, the number of dead flies after the lapse of 24 hours was 0, but the number of dead flies after the lapse of 48 hours was 1, the number of dead flies after the lapse of 72 hours was 6, and the number of dead flies after the lapse of 96 hours was 15, and the attracting ratio of flies was 30 to 40% (about 15 to 20 flies gathered in the vicinity of the petri dish). Next, when the spraying agent of Comparative Example 3 was charged, the number of dead flies after the lapse of 24 hours was 0, but the number of dead flies after the lapse of 48 hours was 11, the number of dead flies after the lapse of 72 hours was 15, and the number of dead flies after the lapse of 96 hours was 17, and the attracting ratio of flies was 30 to 40% (about 15 to 20 flies gathered in the vicinity of the petri dish). Next, when the spraying agent of Comparative Example 4 was charged, the number of dead flies after the lapse of 96 hours was 0, whereas the attracting ratio of flies was always 90% (about 45 flies gathered in the vicinity of the petri dish). When the spraying agent of the Example was charged, the number of dead flies after the lapse of 24 hours was 13, the number of dead flies after the lapse of 48 hours was 28, the number of dead flies after the lapse of 72 hours was 40, and the number of dead flies after the lapse of 96 hours was 46, and the attracting ratio of flies was always 90% (about 45 flies gathered in the vicinity of the petri dish).

According to the results of Experiment 2 described above, it can be said that the spraying agents of Comparative Example 2, Comparative Example 3 and the Example have an effect as a pesticide on the flies as well as on red the red mites as described above. In particular, Comparative Example 4 and the Example containing the attractant that is the protein and the carbohydrate have a higher attracting ratio than those of Comparative Examples 1 to 3 not containing the attractant, so that it can be said that the protein and the carbohydrate have the sufficient effect as the attractant for the flies. In addition, in Comparative Example 3 and the Example containing the alkali metal silicate, it was visually confirmed that it was difficult for the flies immersed in or touched by the spraying agent to fly. Therefore, it can be said that the alkali metal silicate has the sufficient effect as the migration suppressor for the flies. In other words, the Example has not only a larger number of dead flies in a short time but also the largest number of dead flies after the lapse of 96 hours as compared to Comparative Examples 1 to 4, so that it can be said that the effects of the boric acid and the alkali metal silicate as a pesticide are enhanced due to the protein and the like as the attractant and the feeding promoter, and the emulsifier and the like as a removing agent for removing the fat and oil on the epidermis of pests.

Hereinabove, a description has been made of the present invention with reference to the embodiments and Example, but the Example of the present invention is intended to facilitate understanding of the present invention, and do not limit the present invention. The present invention can be modified and improved without departing from its spirit and the scope of the claims, and includes its equivalent.

The invention claimed is:

1. A spraying agent containing a pesticide, consisting of:
   water;
   boric acid;
   an alkali metal silicate;
   an emulsifier or a surfactant;
   an oil or fat; and
   at least one of a protein or a carbohydrate;
   wherein
   the protein is selected from the group consisting of casein, whey, albumen, soybean protein and wheat protein, and
   the carbohydrate is selected from the group consisting of corn syrup, glucose powder, fructose powder and sugar.

2. The spraying agent containing a pesticide according to claim 1, wherein both of the protein and the carbohydrate are included in the spraying agent.

3. The spraying agent containing a pesticide according to claim 2, wherein
   the protein includes the casein, and
   the carbohydrate includes the corn syrup.

4. The spraying agent containing a pesticide according to claim 1, wherein
   the protein includes the casein, and
   the carbohydrate includes the corn syrup.

5. The spraying agent containing a pesticide according to claim 1, wherein
   the oil or fat is an animal oil or fat, or a vegetable oil or fat.

6. The spraying agent containing a pesticide according to claim 5, wherein
   the animal oil or fat is selected from the group consisting of chicken oil, lard, beef tallow and milk fat,
   the vegetable oil or fat is selected from the group consisting of coconut oil, palm oil, corn oil, cottonseed oil, olive oil, rapeseed oil, sesame oil, soybean oil and sunflower oil.

7. The spraying agent containing a pesticide according to claim 1, wherein
   the emulsifier or the surfactant is selected from the group consisting of glycerin fatty acid ester, sorbitan fatty acid ester, sucrose fatty acid ester, propylene glycol fatty acid ester, soybean phospholipid and saponin.

* * * * *